United States Patent Office 3,485,865
Patented Dec. 23, 1969

3,485,865
N-METHOXY AND N-ETHOXY BENZAMIDES
Sidney B. Richter, Chicago, and Jordan P. Berliner, Des Plaines, Ill., assignors to Velsicol Chemical Corporation, Chicago, Ill., a corporation of Illinois
No Drawing. Filed Apr. 5, 1967, Ser. No. 628,529
Int. Cl. C07c *103/74, 65/02;* A01n *9/20*
U.S. Cl. 260—453                                                                 7 Claims

ABSTRACT OF THE DISCLOSURE

Compounds having the formula

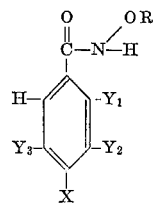

wherein X is selected from the group consisting of alkyl, alkenyl, alkoxy, alkenyloxy, halogen, nitro, amino, alkylamino, dialkylamino and acyl; $Y_1$, $Y_2$ and $Y_3$ are independently selected from the group consisting of hydrogen, alkyl, alkenyl, alkoxy, alkenyloxy, halogen, nitro, amino, alkylamino, dialkyl amino and acyl, provided a maximum of two of X, $Y_1$, $Y_2$ and $Y_3$ are selected from the group consisting of nitro, amino, alkylamino and dialkylamino; and R is an alkyl containing from 1 to 4 carbon atoms are useful in destroying insects by applying to the insect or the locus of the insect an insecticidal composition comprising a compound of the above structure and an inert carrier.

---

This invention relates to new chemical compositions of the formula

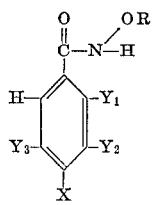

wherein X is selected from the group consisting of alkyl, alkenyl, alkoxy, alkenyloxy, halogen, nitro, amino, alkylamino, dialkylamino and acyl; $Y_1$, $Y_2$, and $Y_3$ are independently selected from the group consisting of hydrogen, alkyl, alkenyl, alkoxy, alkenyloxy, halogen, nitro, amino, alkylamino, dialkylamino and acyl, provided a maximum of two of X, $Y_1$, $Y_2$, and $Y_3$ are selected from the group consisting of nitro, amino, alkylamino and dialkylamino; and R is an alkyl containing from 1 to 4 carbon atoms.

In a preferred embodiment of this invention the constituent X is selected from the group consisting of alkyl, alkenyl, alkoxy and alkenyloxy having up to 4 carbon atoms and nitro, amino and halogen; and the constituents $Y_1$, $Y_2$, and $Y_3$ are independently selected from the group consisting of alkyl, alkenyl, alkoxy and alkenyloxy having up to 4 carbon atoms and hydrogen, halogen, nitro and amio. It is preferred to have a maximum of three substituents on the ring.

The compounds of the present invention are unexpectedly effective as pesticides and particularly as insecticides.

The new compounds of this invention wherein X, $Y_1$, $Y_2$, $Y_3$ and R are as heretofore described can be readily prepared from the corresponding compounds having the following structure

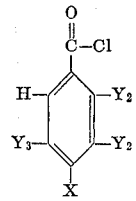

wherein X, $Y_1$, $Y_2$ and $Y_3$ are as described, by adding the substituted benzoyl chloride having structural Formula II to a mixture of an inorganic base such as potassium hydroxide or potassium carbonate, water, an inert organic solvent such as benzene or choloroform and an alkoxy amine or alkoxyamine hydrochloride having the respective formulae $H_2NOR$ and $H_2NOR \cdot HCl$ wherein R is as heretofore described. The reaction mixture is stirred for a period of from about ½ to about 7 hours.

The desired product, if soluble in the organic solvent, can be separated from the aqueous phase, dried and filtered. The solvent can then be removed under vacuum to yield the desired product as the residue. The desired product can then be purified by recrystallization if a solid or by distillation if a liquid.

If the desired product is a solid the reaction mixture can be filtered and the filter cake washed to remove inorganic salts, and dried. The remaining solid can be used as such or can be purified by recrystallization from a suitable solvent.

Compounds in which one or more of the X, $Y_1$, $Y_2$ and $Y_3$ constituents are amino groups can be prepared by hydrogenating the corresponding nitro compound. This can be done by hydrogenating a solution of the corresponding nitrobenzamide in a solvent using a catalyst such as 10% palladium on carbon. The reaction can be performed over a convenient period such as about 2 hours. The reaction mixture can be filtered and the filtrate evaporated under vacuum to yield the desired aminobenzamide as the residue.

The acid chlorides having the structural Formula II can be prepared from the corresponding acid having the following structure

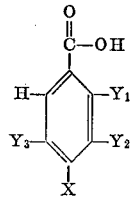

wherein X, $Y_1$, $Y_2$, and $Y_3$ are as heretofore described, by reacting the substituted benzoic acid having structure III with an excess of a chlorinating agent such as thionyl chloride or phosphorus pentachloride in an inert organic solvent such as benzene if desired. The reaction can be performed by heating, preferably at reflux for a period of from about 1 to about 8 hours. The reaction mixture can be distilled under vacuum to remove excess chlorinating agent and the solvent, if used. The residue can be purified by distillation, recrystallization or both to yield the desired substituted benzoyl chloride.

Suitable substituted benzoic acids having the structural Formula III for use in preparing the compounds of this invention are exemplified by 4-methoxybenzoic acid, 4-methylbenzoic acid, 4-chlorobenzoic acid, 4-nitrobenzoic acid, 4-aminobenzoic acid, 2,3,4-trichlorobenzoic acid, 3-allyl-4-methoxybenzoic acid, 4-ethoxybenzoic acid, 4-n-propoxybenzoic acid, 4 - isopropoxybenzoic acid, 4-sec-butoxybenzoic acid, 4-n-butoxybenzoic acid, 4-allyloxybenzoic acid, 3,4 - dimethoxybenzoic acid, 3,4-dimethylbenzoic acid, trimethoxybenzoic acid, 3 - nitro-4-chlorobenzoic acid, 3-fluoro-4-methylbenzoic acid, 3,5-dinitro-4-methylbenzoic acid, 3-methoxy-4-methylbenzoic acid, 3-methyl-4-nitrobenzoic acid, 2-chloro-4-nitrobenzoic acid, 4-acetylbenzoic acid and 4-benzoylbenzoic acid.

Examples of suitable alkoxyamine hydrochlorides for use in preparing the compounds of this invention are exemplified by methoxyamine hydrochloride, ethoxyamine hydrochloride, n-propoxyamine hydrochloride, isopropoxyamine hydrochloride and butoxyamine hydrochloride.

The manner in which the new compounds of the present invention can be prepared readily is illustrated in the following examples:

EXAMPLE 1

Preparation of 4-methoxybenzoyl chloride 4-methoxybenzoic acid (25.2 grams; 0.166 mole) was placed in a 300 ml. glass reaction flask equipped with stirrer, thermometer, reflux condenser with drying tube and heating mantle and containing toluene (50 ml.). Thionyl chloride (13.1 ml.; 0.183 mole) was added and the mixture was heated at reflux with continuous stirring for a period of about 7 hours. After this time the reaction mixture was treated with charcoal and filtered. The filtrate was vacuum distilled to remove the toluene and excess thionyl chloride to give 4-methoxybenzoyl chloride as the residue.

EXAMPLE 2

Preparation of N,4-dimethoxybenzamide

Potassium carbonate (12.6 grams; 0.091 mole), methoxyamine hydrochloride (6.9 grams; 0.083 mole) and benzene (100 ml.) were placed in a 300 ml. glass reaction flask equipped with stirrer, reflux condenser and addition funnel. This mixture was cooled in an ice bath and 10 ml. of water were added followed by the slow addition of 4-methoxybenzoyl chloride (14.2 grams; 0.083 mole) prepared above. The ice bath was replaced by a heating mantle and the reaction mixture heated at reflux with continuous stirring for about 7 hours. After this time the reaction mixture was cooled and filtered. The filter cake was triturated in hot chloroform and the triturate was combined with the filtrate. The organic phase was separated from the aqueous phase, dried over magnesium sulfate, filtered and evaporated under vacuum using a rotary evaporator.

The residue was recrystallized from a benzenepentane mixture, washed with pentane and dried in a desiccator under vacuum to yield N,4-dimethoxybenzamide having a melting point of 100–102.5° C. and having the following elemental analysis:

Analysis for $C_9H_{11}NO_3$.—Theoretical, percent: C, 59.67; H, 6.08; N, 7.73. Actual, percent: C, 59.82; H, 6.20; N, 7.52.

EXAMPLE 3

Preparation of 4-methylbenzoyl chloride 4-methylbenzoic acid (24.8 grams; 0.182 mole), toluene (50 ml.) and thionyl chloride (14.3 ml.; 0.200 mole) were charged into a 300 ml. reaction flask equipped with stirrer, thermometer and reflux condenser with drying tube. The mixture was heated with stirring at reflux for about 7 hours. After this time the mixture was treated with charcoal and filtered. The filtrate was vacuum distilled to remove the toluene and excess thionyl chloride to yield 4-methylbenzoyl chloride as the residue.

EXAMPLE 4

Preparation of N-methoxy-4-methybenzamide

Potassium carbonate (13.8 grams; 0.100 mole), methoxyamine hydrochloride (7.6 grams; 0.091 mole) and benzene (100 ml.) were placed in a 300 ml. glass reaction flask equipped with stirrer, reflux condenser and addition funnel. This mixture was cooled and water (10 ml.) was added followed by the addition of 4-methylbenzoyl chloride (14.1 grams; 0.091 mole) prepared above. The reaction mixture was then heated at reflux with stirring for about 7 hours. After this time the reaction mixture was filtered and the organic phase separated from the aqueous phase. The organic phase was then dried and evaporated under aspirator pressure. The residue was recrystallized to yield N-methoxy-4-methylbenzamide having a melting point of 67–70° C. and having the following elemental analysis:

Analysis for $C_9H_{11}NO_2$.—Theoretical, percent: C, 65.45; H, 6.67; N, 8.48. Actual, percent: C, 65.60; H, 6.71; N, 8.23.

EXAMPLE 5

Preparation of N-methoxy-4-nitrobenzamide

Potassium carbonate (23.2 grams; 0.168 mole), methoxyamine hydrochloride (12.8 grams; 0.153 mole) and benzene (150 ml.) were charged into a 500 ml. reaction flask equipped with stirrer, reflux condenser and additional funnel. The reaction mixture was cooled and 20 ml. of water were added followed by the addition of 4-nitrobenzoyl chloride (28.4 grams; 0.153 mole), in 70 ml. of benzene. The mixture was then heated with stirring at reflux for about 7 hours. After cooling and standing, crystals were formed in the reaction mixture. The crystals were isolated, washed and dried to yield N-methoxy-4-nitrobenzamide having a melting point of 177–178° C. and having the following elemental analysis:

Analysis for $C_8H_8N_2O_4$.—Theoretical, percent: C, 48.98; H, 4.08; N, 14.29. Actual, percent: C, 49.00; H, 4.28; N, 14.12.

EXAMPLE 6

Preparation of 4-methoxy-3-allylbenzoyl chloride 3-allyl-4-methoxybenzoic acid (9.6 grams; 0.050 mole), toluene (40 ml.) and thionyl chloride (7.2 ml.; 0.100 mole) were charged into a 250 ml. reaction flask equipped with stirrer, therometer and reflux condenser with drying tube. The reaction mixture was heated with stirring at reflux for about 7 hours. After this time the reaction mixture was treated with charcoal and filtered. The filtrate was distilled under aspirator pressure to remove the toluene and excess thionyl chloride to yield 3-allyl-4-methoxybenzoyl chloride as the residue.

EXAMPLE 7

Preparation of N,4-dimethoxy-3-allylbenzamide

Potassium carbonate (5.1 grams; 0.037 mole) methoxyamine hydrochloride (2.8 grams; 0.034 mole) and benzene (50 ml.) were placed in a 250 ml. glass reaction flask equipped with stirrer, reflux condenser and addition funnel. This mixture was cooled and 5 ml. of water were added followed by the addition of 3-allyl-4-methoxybenzoyl chloride (7.5 grams; 0.036 mole) prepared above. The reaction mixture was then heated to reflux with stirring for about 6½ hours. After this time the reaction mixture was filtered and the organic phase separated from the aqueous phase. The organic phase was then dried, filtered and evaporated under vacuum. The residue was placed in vacuo for three hours after which it solidified. The solid was recrystallized from benzene-pentane, washed with pentane and dried to yield N,4-dimethoxy-3-allylbenzamide having a melting point of 81–84° C. and having the following elemental analysis:

Analysis for $C_{12}H_{15}NO_3$.—Theoretical, percent: C, 65.16; H, 6.79; N, 6.33. Actual percent: C, 65.64; H, 7.02; N, 6.27.

EXAMPLE 8

Preparation of N-methoxy-4-ethoxybenzamide

Potassium carbonate (11.8 grams; 0.085 mole), methoxyamine hydrochloride (6.4 grams; 0.077 mole) and benzene (100 ml.) were charged into a 300 ml. reaction flask equipped with stirrer, reflux condenser and addition funnel. The reaction mixture was cooled and 10 ml. of water were added followed by the addition of 4-ethoxybenzoyl chloride (14.2 grams; 0.077 mole). The reaction mixture was then heated at reflux with stirring for about 6½ hours. After this time the reaction mixture was filtered and the organic phase separated from the aqueous phase. The organic phase was dried, filtered and evaporated under aspirator pressure. The residue solidified in vacuo. The solid was recrystallized from benzene-pentane, washed with pentane and dried to yield N-methoxy-4-ethoxybenzamide having a melting point of 92–95° C. and having the following elemental analysis:

Analysis for $C_{10}H_{13}NO_3$.—Theoretical, percent: C, 61.54; H, 6.67; N, 7.18. Actual, percent: C, 61.73; H, 6.73; N, 7.18.

EXAMPLE 9

Preparation of 4-n-propoxybenzoyl chloride 4-n-propoxybenzoic acid (25.0 grams; 0.139 mole), thionyl chloride (75 ml.; 105 mole) and toluene (75 ml.) were charged into a 500 ml. glass reaction flask equipped with stirrer, thermometer and reflux condenser with drying tube. The reaction mixture was heated with stirring at reflux for about 7 hours. After this time the reaction mixture was distilled under aspirator pressure to remove the toluene and excess thionyl chloride to yield 4-n-propoxybenzoyl chloride.

EXAMPLE 10

Preparation of N-methoxy-4-n-propoxybenzamide

Potassium carbonate (10.9 grams; 0.079 mole), methoxyamine hydrochloride (6.0 grams; 0.072 mole) and benzene (100 ml.) were placed in a 300 ml. glass reaction flask equipped with stirrer, reflux condenser and addition funnel. This mixture was cooled and 10 ml. of water was added followed by the addition of 4-n-propoxybenzoyl chloride (14.3 grams; 0.072 mole) prepared above. The reaction mixture was then heated at reflux with stirring for about 6½ hours. After this time the reaction mixture was filtered and the organic phase separated from the aqueous phase. The organic phase was dried, filtered, and evaporated, under vacuum. The residue solidified in vacuo, was recrystallized, washed and dried to yield N-methoxy-4-n-propoxybenzamide, having a melting point of 95–97° C. and having the following elemental analysis:

Analysis for $C_{11}H_{15}NO_3$.—Theoretical, percent: C, 63.16; H, 7.18; H, 6.70. Actual, percent: C, 63.34; H, 7.31; N, 6.72.

EXAMPLE 11

Preparation of N-methoxy-4-aminobenzamide

Palladium on carbon (10%) catalyst (200 mg.) was placed in the reaction bottle of a Parr mechanical rocking apparatus and wetted down with water. A solution of N-methoxy-4-nitrobenzamide (16.9 grams; 0.086 mole; prepared in Example 3) in tetrahydrofuran (250 ml.) was added. The bottle was stoppered, placed in the Parr apparatus, evacuated of air, pressured to 50 pounds per square inch with hydrogen and rocked for about 1¾ hours. After this time the reaction mixture was filtered and the filtrate evaporated under aspirator pressure to yield, as the residue, N-methoxy-4-aminobenzamide having a melting point of 126–128° C. and having the following elemental analysis:

Analysis for $C_8H_{10}N_2O_2$.—Theoretical, percent: C, 57.83; H, 6.02; N, 16.87. Actual, percent: C, 57.57; H, 6.23; N, 16.64.

EXAMPLE 12

Preparation of 3,4-dimethoxybenzoyl chloride 3,4-dimethoxybenzoic acid (15.0 grams) and thionyl chloride (15.0 ml.) were placed in a round bottom glass reaction flask equipped with stirrer, thermometer and reflux condenser. The reaction mixture was heated at reflux for about 3 hours with stirring. After this time the reaction mixture was cooled and distilled under vacuum to remove the excess thionyl chloride to yield 3,4-dimethoxybenzoyl chloride as a solid residue.

EXAMPLE 13

Preparation of N,3,4-trimethoxybenzamide

Postassium hydroxide (8.4 grams) dissolved in water (60 ml.), chloroform (150 ml.) and methoxyamine hydrochloride (6.3 grams) were charged into a 500 ml. glass reaction flask equipped with stirrer and thermometer. The reaction mixture was cooled in an ice bath followed by the incremental addition of a solution of 3,4-dimethoxybenzoyl chloride (14.1 grams) prepared above in chloroform (50 ml.). The reaction mixture was then stirred for an additional period of about 45 minutes. After this time the reaction mixture was poured into a separatory funnel and the organic phase separated from the aqueous phase. The organic phase was dried over anhydrous magnesium sulfate, filtered and evaporated under vacuum. The residue was recrystallized from a chloroform-pentane mixture to yield N,3,4 - trimethoxybenzamide having a melting point of 127.5–130° C. and having the following elemental analysis:

Analysis for $C_{10}H_{13}NO_4$.—Theoretical, percent: C, 56,87; H, 6.16; N, 6.63. Actual, percent: C, 56.61, H, 6.28; N, 6.65.

Other compounds within the scope of the present invention can be readily prepared by the procedures described in Examples 1 through 7. Presented in the following examples are the essential materials required to prepare the indicated named compounds according to the procedure details in the previous examples.

EXAMPLE 14

4 - chlorobenzoyl chloride+methoxyamine hydrochloride=N-methoxy-4-chlorobenzamide, melting point 106–108° C.

EXAMPLE 15

2,3,4-trichlorobenzoyl chloride+methoxyamine hydrochloride=N - methoxy-2,3,4-trichlorobenzamide, melting point 160–161° C.

EXAMPLE 16

4-isopropoxybenzoic acid+thionyl chloride+methoxyamine hydrochloride=N - methoxy - 4 - isopropoxybenzamide, melting point 91–93° C.

EXAMPLE 17

4-sec-butoxybenzoic acid+thionyl chloride+methoxyamine hydrochloride=N - methoxy - 4 - sec - butoxybenzamide, refractive index at 25° C. 1.5430.

EXAMPLE 18

4 - n - butoxybenzoic acid+thionyl chloride+methoxyamine hydrochloride=N - methoxy-4-n-butoxybenzamide, melting point 90–92° C.

EXAMPLE 19

4 - allyloxybenzoic acid+thionyl chloride+methoxyamine hydrochloride=N - methoxy-4-allyloxybenzamide, melting point 85–87° C.

EXAMPLE 20

3,4-dimethylbenzoic acid+thionyl chloride+methoxyamine hydrochloride=N - methoxy - 3,4 - dimethylbenzamide, melting point 118.5–120.5° C.

EXAMPLE 21

3,4,5-trimethoxybenzoic acid+thionyl chloride+methoxyamine hydrochloride=N,3,4,5 - tetramethoxybenzamide, melting point 144.5–146.5° C.

EXAMPLE 22

3-nitro-4-chlorobenzoic acid+thionyl chloride+methoxyamine hydrochloride=N - methoxy-3-nitro-4-chlorobenzamide, melting point 156–158° C.

EXAMPLE 23

3 - fluoro - 4 - methylbenzoic acid+thionyl chloride +methoxyamine hydrochloride=N - methoxy-3-fluoro-4-methylbenzamide, melting point 105–107- C.

EXAMPLE 24

3,5 - dinitro - 4 - methylbenzoic acid+thionyl chloride +methoxymine hydrochloride=N - methoxy-3,5-dinitro-4-methylbenzamide, melting point 175–176° C.

EXAMPLE 25

3 - methoxy - 4 - methylbenzoic acid+thionyl chloride +methoxyamine hydrochloride=N,3-dimethoxy-4-methylbenzamide, melting point 95–97° C.

EXAMPLE 26

3 - methyl - 4 - nitrobenzoic acid+thionyl chloride +methoxyamine hydrochloride=N-methoxy-3-methyl-4-nitrobenzamide, melting point 133.5–134.5° C.

EXAMPLE 27

2 - chloro - 4 - nitrobenzoic acid+thionyl chloride +methoxyamine hydrochloride=N - methoxy-2-chloro-4-nitrobenzamide, melting point 159–161° C.

EXAMPLE 28

4 - benzoylbenzoic acid+thionyl chloride+methoxyamine hydrochloride=N - methoxy-4-benzoylbenzamide, melting point 105–108° C.

EXAMPLE 29

4 - methoxybenzoic acid+thionyl chloride+thionyl chloride+ethoxyamine hydrochloride=N-ethoxy-4-methoxybenzamide.

EXAMPLE 30

4 - acetylbenzoic acid+thionyl chloride+isopropoxyamine hydrochloride=N - isopropoxy-4-acetylbenzamide.

EXAMPLE 31

4 - methoxybenzoic acid+thionyl chloride+butoxyamine hydrochloride=N-butoxy-4-methoxybenzamide.

Further compounds within the scope of this invention which can be prepared in a manner similar to that outlined above, but which are not intended to limit this invention, are N-ethoxy-4-methylbenzamide,
N-ethoxy-4-nitrobenzamide,
N-ethoxy-4-methoxy-3-allylbenzamide,
N,4-ethoxybenzamide,
N-ethoxy-4-propoxybenzamide,
N-ethoxy-4-aminobenzamide,
N-ethoxy-3,4-dimethoxybenzamide,
N-ethoxy-4-chlorobenzamide,
N-ethoxy-2,3,4-trichlorobenzamide,
N-ethoxy-4-sec-butoxybenzamide,
N-ethoxy-4-n-butoxybenzamide,
N-ethoxy-4-allyloxybenzamide,
N-ethoxy-3,4-dimethylbenzamide,
N-ethoxy-3,4,5-trimethoxybenzamide,
N-ethoxy-3-nitro-4-chlorobenzamide,
N-ethoxy-3-fluoro-4-methylbenzamide,
N-ethoxy-3,5-dinitro-4-methylbenzamide,
N-ethoxy-3-methoxy-4-methylbenzamide,
N-ethoxy-3-methyl-4-nitrobenzamide,
N-ethoxy-2-chloro-4-nitrobenzamide,
N-ethoxy-4-benzoylbenzamide,
N-ethoxy-4-acetylbenzamide,
N-propoxy-4-methoxybenzamide,
N-propoxy-4-methylbenzamide,
N-propoxy-4-nitrobenzamide,
N-propoxy-4-methoxy-3-allylbenzamide,
N-propoxy-4-ethoxybenzamide,
N,4-dipropoxybenzamide,
N-propoxy-4-aminobenzamide,
N-propoxy-3,4-dimethoxybenzamide,
N-propoxy-4-chlorobenzamide,
N-propoxy-2,3,4-trichlorobenzamide,
N-propoxy-4-butoxybenzamide,
N-propoxy-4-allyloxybenzamide,
N-propoxy-3,4-dimethylbenzamide,
N-propoxy-3,4,5-trimethoxybenzamide,
N-propoxy-3-nitro-4-chlorobenzamide,
N-propoxy-3-fluoro-4-methylbenzamide,
N-propoxy-3,5-dinitro-3,5-dinitro-4-methylbenzamide,
N-propoxy-3-methoxy-4-methylbenzamide,
N-propoxy-3-methyl-4-nitrobenzamide,
N-propoxy-2-chloro-4-nitrobenzamide,
N-propoxy-4-benzoylbenzamide and the like.

For practical use as insecticides, the compounds of this invention are generally incorporated into insecticidal compositions which comprise an inert carrier and an insecticidally toxic amount of such a compound. Such insecticidal compositions, which can also be called formulations, enable the active compound to be applied conveniently to the site of the insect infestation in any desired quantity. These compositions can be solids such as dusts, granules, or wettable powders; or they can be liquids such as solutions, aerosols, or emulsifiable concentrates.

For example, dusts can be prepared by grinding and blending the active compound with a solid inert carrier such as the talcs, clays, silicas, pyrophyllite, and the like. Granular formulations can be prepared by impregnating the compound, usually dissolved in a suitable solvent, onto and into granulated carriers such as the attapulgites or the vermiculites, usally of a particle size range of from about 0.3 to 1.5 mm. Wettable powders, which can be dispersed in water and/or oil to any desired concentration of the active compound, can be prepared by incorporating wetting agents into concentrated dust compositions.

In some cases the active compounds are sufficiently soluble in common organic solvents such as kerosene or xylene so that they can be used directly as solutions in these solvents. Frequently, solutions of insecticides can be dispersed under superatmospheric pressure as aerosols. However, preferred liquid insecticidal compositions are emulsifiable concentrates, which comprise an active compound according to this invention and as the inert carrier, a solvent and an emulsifier. Such emulsifiable concentrates can be extended with water and/or oil to any desired concentration of active compound for application as sprays to the site of the insect infestation. The emulsifiers most commonly used in these concentrates are nonionic or mixtures of nonionic with anionic surface-active agents.

A typical insecticidal composition according to this invention is illustrated by the following example, in which the quantities are in parts by weight.

EXAMPLE 32

Preparation of a dust

N,4-dimethoxybenzamide _____ 10
Powdered talc _____ 90

The above ingredients are mixed in a mechanical grinder-blender and are ground until a homogenous, free-flowing dust of the desired particle size is obtained. This dust is suitable for direct application to the site of the insect infestation.

The compounds of this invention can be applied an insecticides in any manner recognized by the art. One method for destroying insects comprises applying to the locus of the insect infestation an insecticidal composition comprising an inert carrier and as the essential active ingredient, in a quantity which is toxic to said insects, a compound of the present invention. The concentration of the new compounds of this invention in the insecticidal compositions will vary greatly with the type of formulation and the purpose for which it is designed, but generally the insecticidal compositions will comprise from about 0.05 to about 95 percent by weight of the active compounds of this invention. In a preferred embodiment of this invention, the insecticidal compositions will comprise from about 5 to 75 percent by weight of the active compound. The compositions can also comprise such additional substances as other pesticides, stabilizers, spreaders, deactivators, adhesives, stickers, fertilizers, activators synergists, and the like.

The compounds of the present invention are also useful when combined with other insecticides in the insecticidal compositions heretofore described. These other insecticides can comprise from about 5% to about 95% of the active ingredients in the insecticidal compositions. Use of the combinations of these other insecticides with the compounds of the present invention provide insecticidal compositions which are more effective in controlling insects and often provide results unattainable with separate compositions of the individual insecticides. The other insecticides with which the compounds of this invention can be used in the insecticidal compositions to control insects, can include halogenated compounds such as DDT, methoxychlor, TDE, lindane, chlordane, isobenzan, aldrin, dieldrin, heptachlor, endrin, mirex, endosulfon, dicofol, and the like; organic phosphorus compounds such as TEPP, schradan, ethion, parathion methyl parathion, EPN, demeton, carbophenothion, phorate, zinophos, diazinon, malathion, mevinphos, dimethoate, DBD, ronnel, oxydemeton-methyl, dicapthon, chlorothion, phosphamidon, naled, fenthion, trichlorofon, DDVP, and the like; organic nitrogen compounds such as dinitro-o-cresol, dinitrocyclohexylphenol, DNB, DNP, binapacril, azobenzene, and the like; organic carbamate compounds such as carbaryl, ortho 5353, and the like; organic sulfur compounds such as phenothiazine, phenoxathin, lauryl thiocyanate, [bis(2-thiocyanoethyl)ether], isobornyl thiocyanoacetate, and the like; as well as such substances usually referred to as fumigants, as hydrogen cyanide, carbon tetrachloride, calcium cyanide, carbon disulfide, ethylene dichloride, propylene dichloride, ethylene dibromide, ethylene oxide, methyl bromide, paradichlorobenzene, and the like.

The compounds of the present invention can also be combined with fungicidal and nematocidal chemical compounds to form pesticidal compositions useful for the control of fungi and in some cases soil nematodes as well as insects. Typical examples of such fungicidal chemical compounds are ferbam, nabam, zineb, ziram, thiram, chloranil, dichlone, glyodin, cycloheximide, dinocap, maneb, captan, dodine, PCNB, p-dimethylaminobenzenediazo sodium sulfonate and the like; while examples of nematocidal compounds are chloropicrin, O,O-diethyl O - (2,4 - dichlorophenyl) phosphorothioate, tetrachlorothiophen, dazomet, dibromochloropropane, and the like.

The new compounds of this invention can be used in many ways for the control of insects. Insecticides which are to be used as stomach poisons can be applied to the surface on which the insects feed or travel. Insecticides which are to be used as contact poisons or eradicants can be applied directly to the body of the insect, as a residual treatment to the surface on which the insect may walk or crawl, or as a fumigant treatment of the air which the insert breathes. In some cases, the compounds applied to the soil or plant surfaces are taken up by the plant, and the insects are poisoned systemically.

The above methods of using insecticides are based on the fact that almost all the injury done by insects is a direct or indirect result of their attempts to secure food. Indeed, the large number of destructive insects can be classified broadly on the basis of their feeding habits. Among the insects which can be effectively controlled by the compounds of the present invention are the chewing insects such as the Mexican bean beetle, the southern armyworm; the piercing-sucking insects, such as the pea aphid, the cereal leaf beetle, the house fly, the grape leafhopper, the chinch bug, the lygus bugs, oyster shell scale, the California red scale, the Florida red scale, the soft scale and mosquitoes; the internal feeders, including borers such as the European corn borer, the peach twig borer and the corn earworm, worms or weevils such as codling moth, alfalfa weevil, cotton boll weevil, pink boll worm, plum curculio, red banded leaf roller, melonworm, cabbage looper and apple maggot, leaf miners such as the apple leaf miner, birch leaf miner and beet leaf miner, and gall insects such as the wheat joint worm and the grape phylloxera. Insects which attack below the surface of the ground are classified as subterranean insects and include such destructive pests as the wooly apple aphid, the Japanese beetle, the onion maggot and the corn rootworm.

The quantity of active compound of this invention to be used for insect control will depend on a variety of factors, such as the specific insect involved, intensity of the infestation, weather, type of environment, type of formulation, and the like. For example, the application of only one or two ounces of active chemical per acre may be adequate for control of a light infestation of insects under conditions unfavorable to their feeding, while a pound or more of active compound per acre may be required for the control of a heavy infestation of insects under conditions favorable to their development.

The compounds of the present invention are particularly valuable since they are selective in their insecticidal action. For example, the compounds are particularly effective against insects of the order Lepidoptera, such as the southern armyworm, while they are non-toxic to other insects.

The insecticidal utility of the compound of the present invention can be demonstrated by various experiments recognized by the art. In one series of experiments the test compounds were formulated by dissolving the compounds in acetone and dispersing the acetone solution in distilled water containing 0.2% by volume of alkyl amyl polyether alcohol type emulsifiers.

In one experiment carried out for the control of insect pests by feeding, lima bean leaves were sprayed on the top and bottom surfaces with the above formulation at the concentration indicated below and offered to ten larvae of the southern armyworm (late third instar stage) for a feeding period of 48 hours. After this period the mortality was observed. Some of the results were as follows:

TABLE I

| Test chemical | Concn., p.p.m., actual chemical in liquid sprayed | Percent mortality |
|---|---|---|
| N,4-dimethoxybenzamide | 31500 | 100 |
| Do | 1,000 | 100 |
| N-methoxy-4-methylbenzamide | 3,500 | 100 |
| N-methoxy-4-nitrobenzamide | 3,500 | 100 |
| N,4-dimethoxy-3-allylbenzamide | 3,500 | 80 |
| N-methoxy-4-ethoxybenzamide | 3,500 | 90 |
| N-methoxy-4-n-propoxybenzamide | 3,500 | 100 |
| N-methoxy-4-chlorobenzamide | 3,500 | 80 |
| N-methoxy-4-aminobenzamide | 3,500 | 90 |
| N-methoxy-3,4-dimethylbenzamide | 3,500 | 100 |
| N-methoxy-3-nitro-4-chlorobenzamide | 3,500 | 100 |
| N-methoxy-3-fluoro-4-methylbenzamide | 3,500 | 100 |
| N,3-dimethoxy-4-methylbenzamide | 3,500 | 100 |
| N-methoxy-3-methyl-4-nitrobenzamide | 3,500 | 100 |
| Control | | 0 |

We claim:
1. A compound of the formula

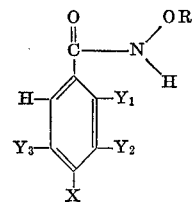

wherein X is selected from the group consisting of alkyl, alkenyl, alkoxy and alkenyloxy, each having up to 4 carbon atoms, acetyl, benzoyl, chloro and fluoro; $Y_1$ is hydrogen or chlorine; $Y_2$ and $Y_3$ are independently selected from the group consisting of hydrogen, alkyl, alkenyl, alkoxy, alkenyloxy, each having up to 4 carbon atoms, acetyl and benzoyl provided that at least one of $Y_1$, $Y_2$ and $Y_3$ is hydrogen, and R is methyl or ethyl.

2. The compound of claim 1 wherein the compound is N,4-dimethoxy-benzamide.

3. The compound of claim 1 wherein the compound is N-methoxy-4-methylbenzamide.

4. The compound of claim 1 wherein the compound is N,4-dimethoxy-3-allylbenzamide.

5. The compound of claim 1 wherein the compound is N-methoxy-4-ethoxybenzamide.

6. The compound of claim 1 wherein the compound is N-methoxy-4-n-propoxybenzamide.

7. The compound of claim 1 wherein the compound is N-methoxy-4-benzoylbenzamide.

References Cited

UNITED STATES PATENTS

| | | |
|---|---|---|
| 3,398,180 | 8/1968 | Goldberg et al. |
| 3,052,602 | 9/1962 | Hymas et al. |
| 3,187,042 | 6/1965 | Richter. |
| 3,190,800 | 6/1965 | Furst _____ 260—453 X |
| 3,212,873 | 10/1965 | Richter et al. _____ 260—453 X |
| 3,236,871 | 2/1966 | Hinway et al. _____ 260—453 |
| 3,352,899 | 11/1967 | Taniguchi et al. _____ 260—453 |
| 3,364,110 | 1/1968 | Lehr et al. |

OTHER REFERENCES

Exner et al.: Chemical Abstracts, volume 63, column 3785h (1965).

Exner et al.: Collection of Czechoslovak Chemical Communications, volume 30, number 4, pp. 940–951 (1965).

Exner et al.: Collection of Czechoslovak Chemical Communications, volume 30, number 10, pp. 4078–4093 (1965).

CHARLES B. PARKER, Primary Examiner

S. T. LAWRENCE, III, Assistant Examiner

U.S. Cl. X.R.

71—3; 260—515, 518, 519, 521, 544; 424—298

UNITED STATES PATENT OFFICE
CERTIFICATE OF CORRECTION

Patent No. 3,485,865          Dated December 23, 1969

Inventor(s) Sidney B. Richter and Jordan P. Berliner

It is certified that error appears in the above-identified patent and that said Letters Patent are hereby corrected as shown below:

Col. 1, line 66, "amio." should read --amino.--.
Col. 4, lines 20 and 21, "additional" should read --addition--.
Col. 5, line 20, "105" should read --1.05--.
Col. 7, line 12, "methoxymine" should read --methoxyamine--;
         lines 37 and 38, delete " + thionyl chloride" in
         the second occurrence.
Col. 8, line 15, delete "3,5-dinitro-" in the second
         occurrence; line 71, "an" should read --as--.
Col. 10, line 50, in Table I, under Concn. "31500"
         should read --3,500--.

SIGNED AND
SEALED
JUL 21 1970

(SEAL)
Attest:

Edward M. Fletcher, Jr.
Attesting Officer

WILLIAM E. SCHUYLER, JR.
Commissioner of Patents